(12) United States Patent
Fuchida (10) Patent No.: US 8,138,920 B2
(45) Date of Patent: Mar. 20, 2012

(54) TAG READER

(75) Inventor: Hidehiko Fuchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/977,174

(22) Filed: Dec. 23, 2010

(65) Prior Publication Data

US 2011/0260868 A1    Oct. 27, 2011

Related U.S. Application Data (63) Continuation of application No. 11/947,854, filed on Nov. 30, 2007, now abandoned.

(30) Foreign Application Priority Data

Jan. 24, 2007    (JP) ................................. 2007-014337

(51) Int. Cl.
   *G08B 13/14* (2006.01)
(52) U.S. Cl. ............... 340/572.1; 340/572.4; 340/572.8; 340/10.1; 340/5.92; 700/236
(58) Field of Classification Search .... 340/572.1–572.9, 340/5.92, 10.1, 10.5; 700/236
   See application file for complete search history.

(56) References Cited

U.S. PATENT DOCUMENTS

| | | | |
|---|---|---|---|
| 6,943,678 B2 | 9/2005 | Muirhead | |
| 7,136,721 B2 | 11/2006 | Sano et al. | |
| 7,307,533 B2 | 12/2007 | Ishii | |
| 7,348,886 B2 | 3/2008 | Himberger et al. | |
| 7,768,402 B2 | 8/2010 | Chen et al. | |
| 2002/0017990 A1 | 2/2002 | Okamura | |
| 2005/0071234 A1 | 3/2005 | Schon | |
| 2006/0290493 A1 | 12/2006 | Taki | |
| 2007/0040682 A1 | 2/2007 | Zhu et al. | |

FOREIGN PATENT DOCUMENTS

| | | |
|---|---|---|
| JP | 10-324405 | 12/1998 |
| JP | 2002-037413 | 2/2002 |
| JP | 2004-91088 | 3/2004 |
| JP | 2004-115214 | 4/2004 |
| JP | 2005-215959 | 8/2005 |
| JP | 2006-160324 | 6/2006 |
| TW | 200504547 A | 2/2005 |
| TW | M301920 | 12/2006 |
| WO | WO2006070461 | 7/2006 |

OTHER PUBLICATIONS

Letter from Nextreme, LLC 2282 University Drive, Lemont Furnace, Pennsylvania, 15456, USA, Scott Muirhead, to Scott A. Elchert, Re: U.S. Appl. No. 11/947,854, filed Jul. 23, 2010.
Korean Office Action mailed on May 29, 2009, issued in corresponding Korean Patent Application No. 10-2007-0122048.
Extended European Search Report, mailed Jul. 1, 2008, issued in corresponding European Patent Application No. 07121703.8.

(Continued)

*Primary Examiner* — Jennifer Mehmood
*Assistant Examiner* — Hongmin Fan
(74) *Attorney, Agent, or Firm* — Fujitsu Patent Center (57) ABSTRACT

A tag is attached to each piece of a set of goods mounted on a palette, and a tag storing the quantity of goods that should be mounted on the palette is also attached. A reader/writer counts the number of tags attached to all of the goods, reads quantity information of the tags attached to the palette, and determines whether the two are equal or not.

12 Claims, 7 Drawing Sheets

OTHER PUBLICATIONS

USPTO, [FAN] "U.S. Appl. No. 11/947,854 (parent)",[CTNF] Non-Final Office Action issued on Oct. 28, 2009.
USPTO, [FAN] "U.S. Appl. No. 11/947,854 (parent)",[NOA] Notice of Allowance issued on Jun. 14, 2010.
USPTO, [FAN] "U.S. Appl. No. 11/947,854 (parent)",[NOA] Notice of Allowance issued on Oct. 1, 2010.
"Taiwan Official Letter and Search Report", mailed by Taiwan Patent Office and corresponding to Taiwan (R.O.C.) patent application No. 096142016 on Mar. 24, 2011 (English translation of Search Report & Explanation of relevance).
Japanese Office Action mailed Jan. 10, 2012 for corresponding Japanese Application No. 2007-014337, with English-language translation.

TAG READER

BACKGROUND OF THE INVENTION

1. Field of the Invention

The present invention relates to a bulk reader of RFID tags.

2. Description of the Related Art

In fields such as manufacturing and logistics, it may be necessary to be able to recognize a number of individuals, each of which has an RFID tag, in bulk by using an RFIS reader/writer.

Regarding the RFID tags, it is possible to read or write a number of RFID tags within an accessible range successively in bulk. At that time, only the tags that could be recognized by the reader/writer are accessed, and thus, the presence or absence of the tags that could not be recognized cannot be determined.

In fact, there sometimes are tags that are unrecognizable due to the orientation and position of the tag or due to a defect in the tag. Determination of the presence or absence of such unrecognizable tags is essential to improving the accuracy of bulk access.

SUMMARY OF THE INVENTION

It is an object of the present invention to provide an RFID tag reader that can determine the presence or absence of tags that could not be recognized at the time of tag recognition using a reader/writer.

The tag reader according to the present invention is a tag reader for detecting the number of goods via a tag attached to the goods and counting the number of tags read by a reader/writer, and has determination means for determining whether reading of the tag has been properly conducted or not by comparing the quantity of goods mounted on a goods mounting means to which a tag having quantity information relating to the quantity of mounted goods is attached and the quantity information of the tag attached to the goods mounting means.

Because bulk access, which is successive access to plural tags that are present within a prescribed range, enables accurate recognition of the quantity of tags that are required to be processed and the quantity of tags being actually processed, the normality of the performed processing is confirmed, trouble-shooting processing can be performed properly, and thereby overall processing accuracy can be improved.

DESCRIPTION OF THE PREFERRED EMBODIMENTS

Figure 1:
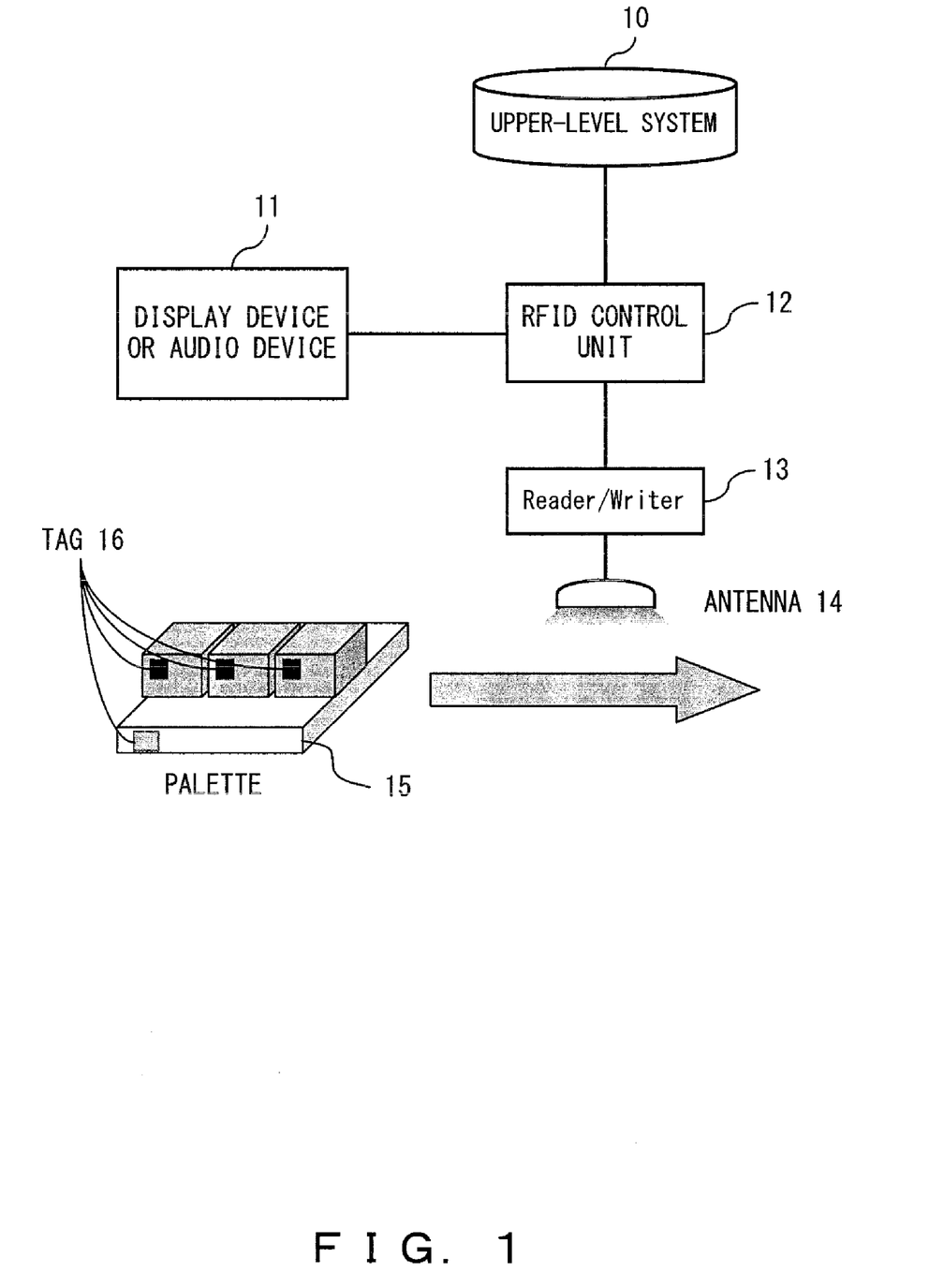
FIG. 1 is a block diagram of an RFID system according to the embodiments of the present invention.

FIG. 1 is a block diagram of an RFID system according to the embodiments of the present invention.

An RFID control unit 12 is connected to an upper-level system 10 such as an application for managing overall workflow in a place of business. The RFID control unit 12 executes a series of processes in accordance with the embodiments of the present invention. A display device or an audio device 11 is connected to the RFID control unit 12, and when the RFID control unit 12 detects an error, an operator is notified of the error occurrence. A reader/writer 13 is connected to the RFID control unit 12, radio waves are transmitted to a tag 16 via an antenna 14, and the information of the tag 16 is read. The tag 16 is attached to each piece of the goods etc. mounted on a palette 15. The goods mounted on the palette 15 are counted as a single unit and they move down the operation process. When the goods mounted on the palette 15 pass in front of the antenna 14, the reader/writer 13 reads the information of the tag attached to the goods on the palette 15. When the tag information is read, the information of the tag attached to all the goods on the palette 15 and the information of the tag attached to the palette 15 are read successively. Such a manner of accessing a number of tags in units of palettes etc. successively as just described above is referred to as bulk access.

Figure 2:
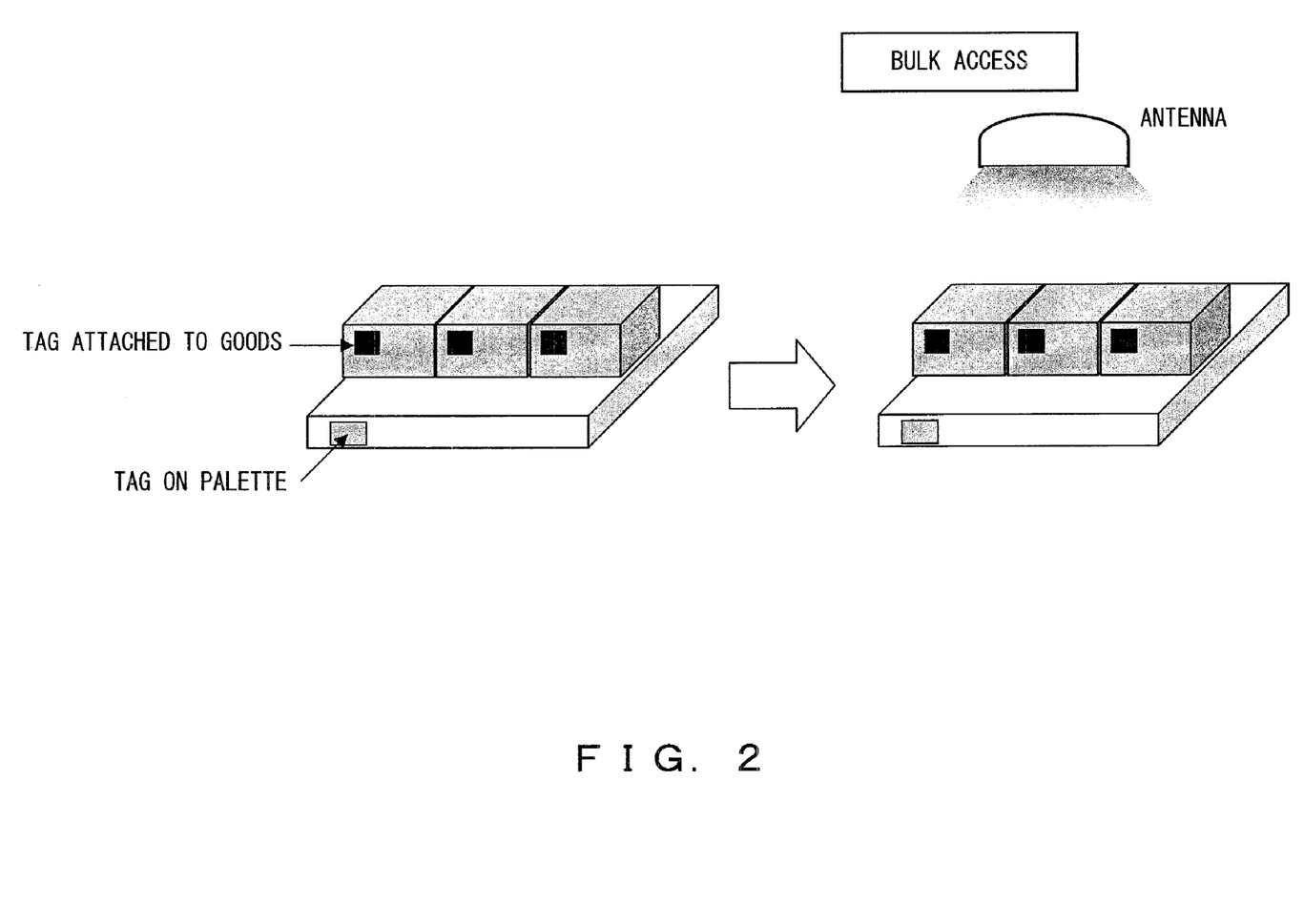
FIG. 2 is a diagram explaining a first embodiment of the present invention.

FIG. 2 is a diagram explaining a first embodiment of the present invention.

In the first embodiment of the present invention, a tag is placed on a carrier (or a palette or the like) used in a bulk access operation of the tags attached to goods. At the time at which bulk access is made to the tags attached to the goods, the quantity of the tags attached to the goods on the carrier is recognized by accessing the tag on the carrier and reading the written information (indicating the number of goods that should be mounted on the carrier or the palette or the like). By comparing the information with the quantity of tags actually accessed attached to the goods, the normality of the bulk access can be evaluated (in other words, the presence or absence of an unrecognized tag is determined).

In the first embodiment, a tag is placed on the palette. When goods having a tag attached are mounted on a carrier, the quantity of the mounted goods is written on the tag on the palette (other information such as a carrier ID is also stored). When the bulk access is performed on the tags attached to the goods mounted on the palette, the quantity information written on the tag attached to the carrier is read. The accessed quantity of tags attached to goods is counted. The above two kinds of information are compared. In the comparison processing, the decision is made as below.

Quantity information=Accessed number of tags attached to goods

Normal termination

Quantity information>Accessed number of tags attached to goods

Inaccessible tag attached to the goods present

Quantity information<Accessed number of tags attached to goods

Cannot happen (go to trouble-shooting processing)

In a case such as that of FIG. 2, it is determined to be normal if the quantity information of the tag on the palette=3, and the accessed number of tags attached to the goods=3. If the accessed number of tags attached to the goods is 2 or less, it is determined that there are tags that could not be read. If the accessed number of tags attached to the goods is 4 or above, it is determined to be abnormal, and the operator is notified of the occurrence of an error.

Figure 3:
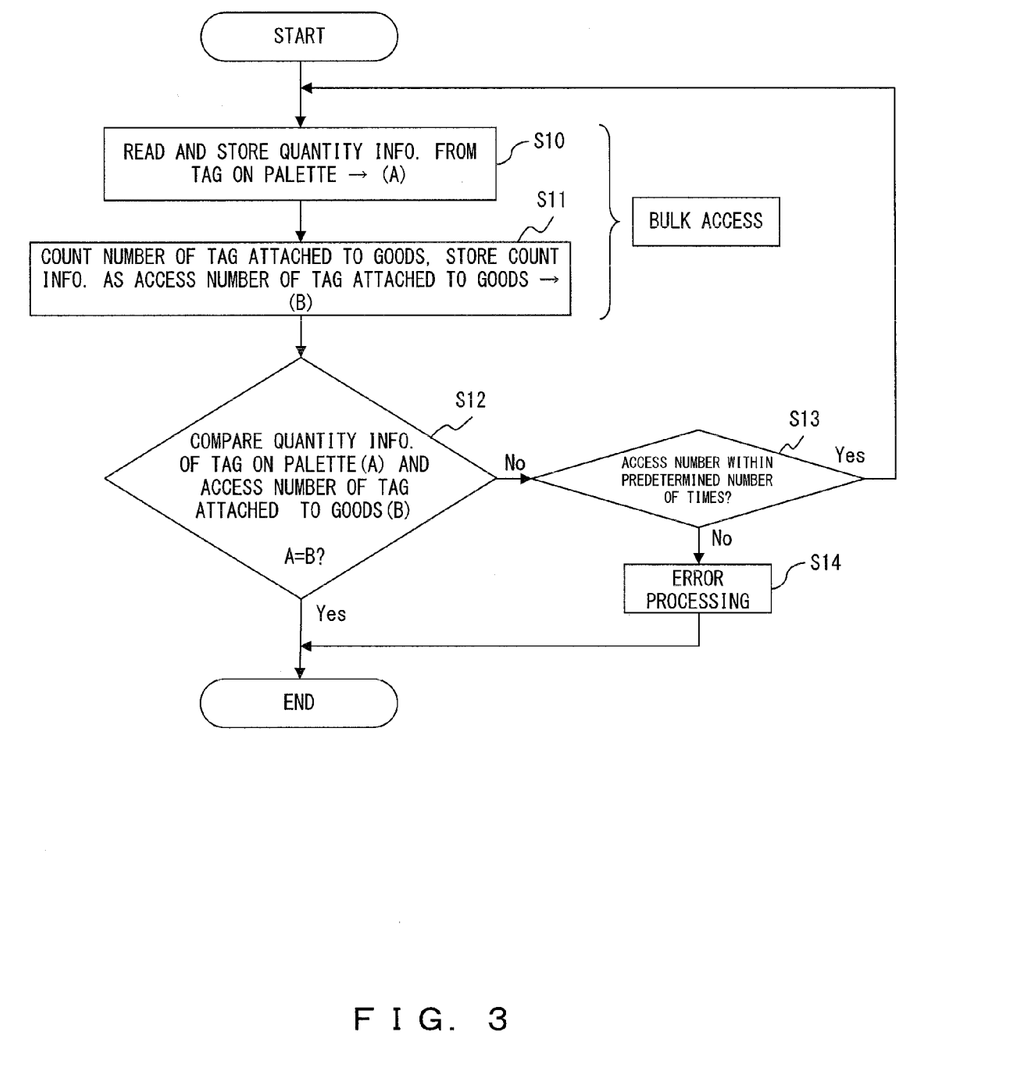
FIG. 3 is a flowchart of the bulk access processing that a reader/writer of the first embodiment of the present invention performs.

FIG. 3 is a flowchart of the bulk access processing performed by a reader/writer of the first embodiment of the present invention.

In step S10, first, quantity information is read from the tag on the palette, and the quantity information of the tag on the palette is stored. In step S11, the number of tags attached to the goods is counted, and the count information is stored as an accessed number of tags attached to the goods. The processing in steps S10 and S11 is performed in bulk access in units of palettes. In step S12, the quantity information of the tags on the palette is compared with the accessed number of tags attached to the goods, and whether the two are equal or not is determined. If the determination in step S12 is Yes, the processing is recognized as normal and is terminated. If the determination in step S12 is No, then whether the accessed number is within the predetermined number or not is determined in step S13. When the processing is determined to be abnormal in the determination of step S12, a notification to instruct the operator to cause the palette to pass in front of the antenna is issued, and the number of times that the palette passes in front of the antenna is referred to as the number of times accessed. The processing in step S13 determines whether the number of times that the palette passes in front of the antenna is within the predetermined number of times or not. If the determination in step S13 is Yes, an instruction is issued to have the operator restore the palette and cause the palette to pass in front of the antenna again, and the processing returns to step S10. If the determination in step S13 is No, it is determined to be abnormal, and in step S14, the operator is notified of the error and the processing is terminated.

Figure 4:
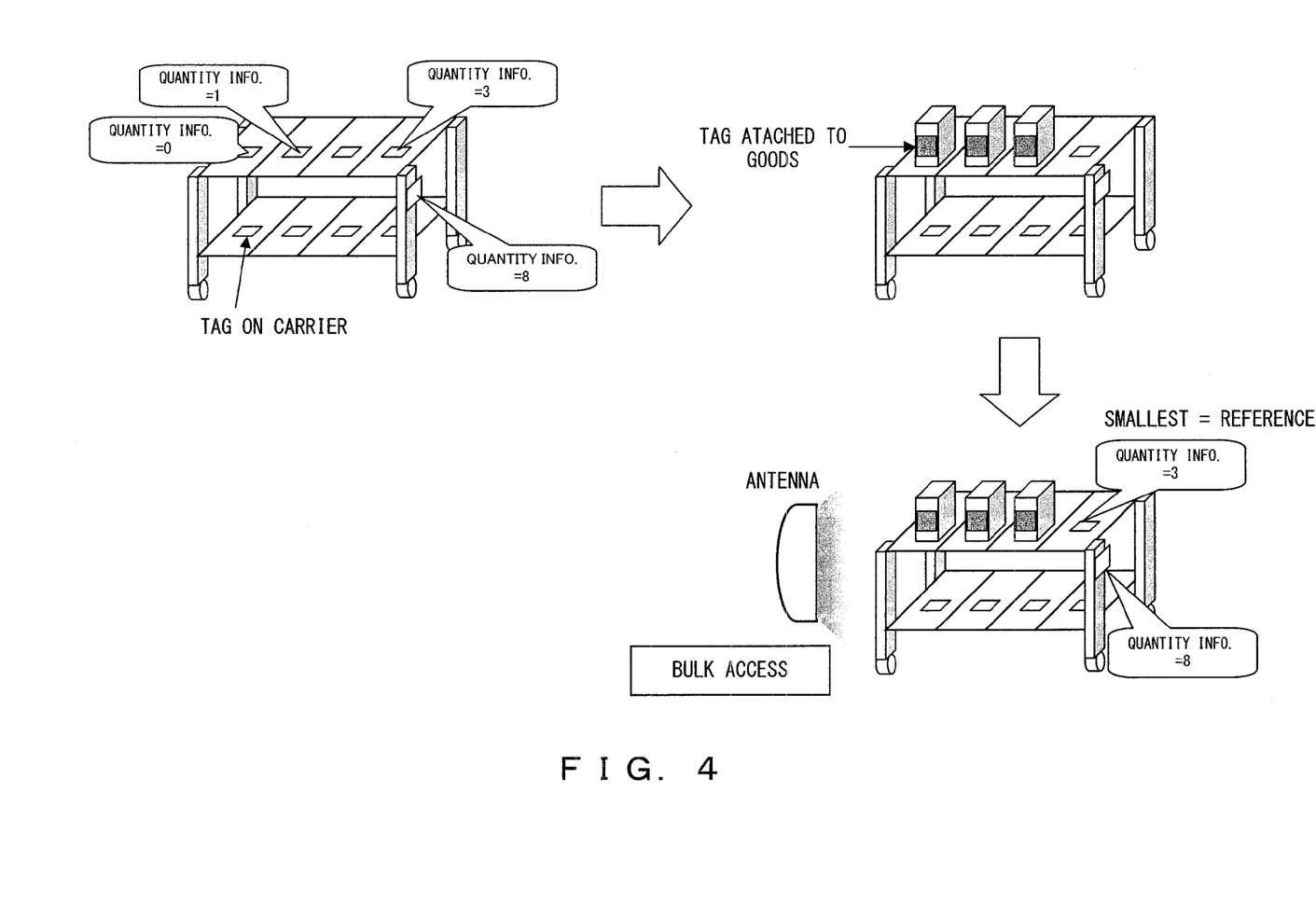
FIG. 4 is a diagram explaining the second embodiment of the present invention.

FIG. 4 is a diagram explaining the second embodiment of the present invention.

In the second embodiment, tags are placed in (plural) positions on the carrier where goods are to be mounted. In addition to the carrier ID (common ID in the same carrier), quantity information is stored in each of the tags in ascending order, starting from zero and incremented upward by one in each tag; the number placed at the first position in which goods are not mounted is the number of goods stored.

By mounting the goods having tags attached on the carrier, the tags on the carrier are blocked in sequence (blocked by the goods themselves or by providing to the carrier a mechanism to block the tags at the mounting). The mounting of the goods on the carrier is performed in the order from the tag with the smallest quantity information. When bulk access is performed on the tags attached to the goods on the carrier, the quantity information written on the tag on the carrier is read, and the smallest piece of the quantity information is set as a reference. The quantity of accessed tags attached to the goods is counted. The above two kinds of information are compared with each other. As a result of the reference, the determination is made as below.

Reference quantity information=Accessed number of tags attached to goods
    Normal termination
Reference quantity information>Accessed number of tags attached to goods
    Inaccessible tags attached to goods present
Reference quantity information<Accessed number of tags attached to goods
    Cannot happen (Tags not on the carrier have been accessed?)

In a case such as that shown FIG. 4, if the smallest (=reference) quantity information of the tags on the carrier=3, and the accessed number of tags attached to the goods=3, the determination is made that the situation is normal. If the accessed number of tags attached to the goods is 2 or less, it is determined that there are tags that could not be detected. If the accessed number of tags attached to the goods is 4 or above, the determination is made that the situation is abnormal (possibility of reading tags other than those on the carrier).

Figure 5:
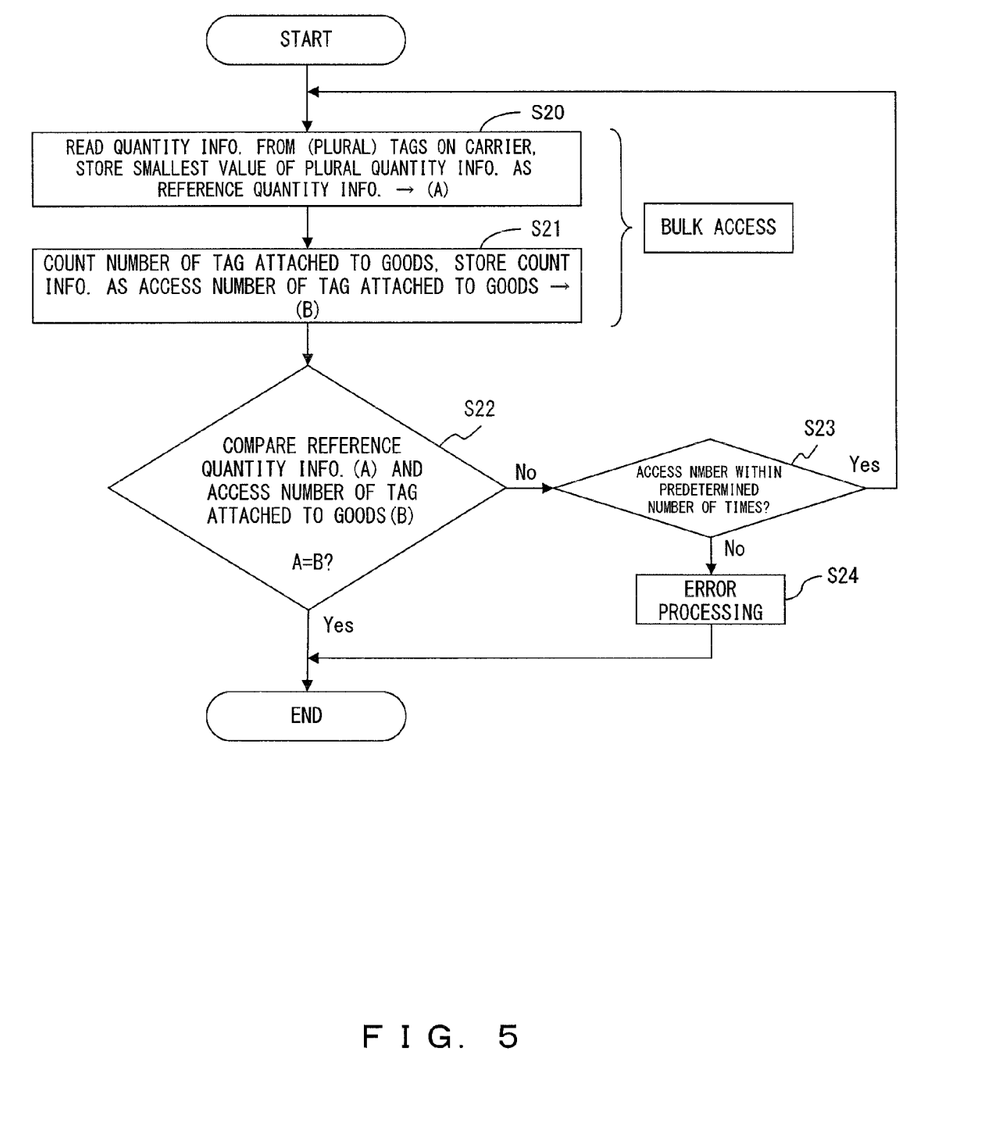
FIG. 5 is a flowchart of the bulk access processing that the reader/writer in the second embodiment performs.

FIG. 5 is a flowchart of the bulk access processing that the reader/writer in the second embodiment performs.

In step S20, the quantity information is read from plural tags on the carrier, and the smallest value of the plural quantity information is stored as reference quantity information. In step S21, the number of tags attached to the goods is counted, and the count information is stored as the accessed number of tags attached to the goods. Processing in step S20 and step S21 is performed in the bulk access. In step S22, the reference quantity information is compared with the accessed number of tags attached to the goods, and whether the two are equal or not is determined. When the determination in step S22 is Yes, the processing is terminated. When the determination in step S22 is No, whether the number of times accessed is within the predetermined number of times or not is determined in step S23. When the determination in step S23 is Yes, the processing goes back to step S20, and when the determination in step S23 is No, the error processing is performed in step S24, and the processing is terminated.

Figure 6:
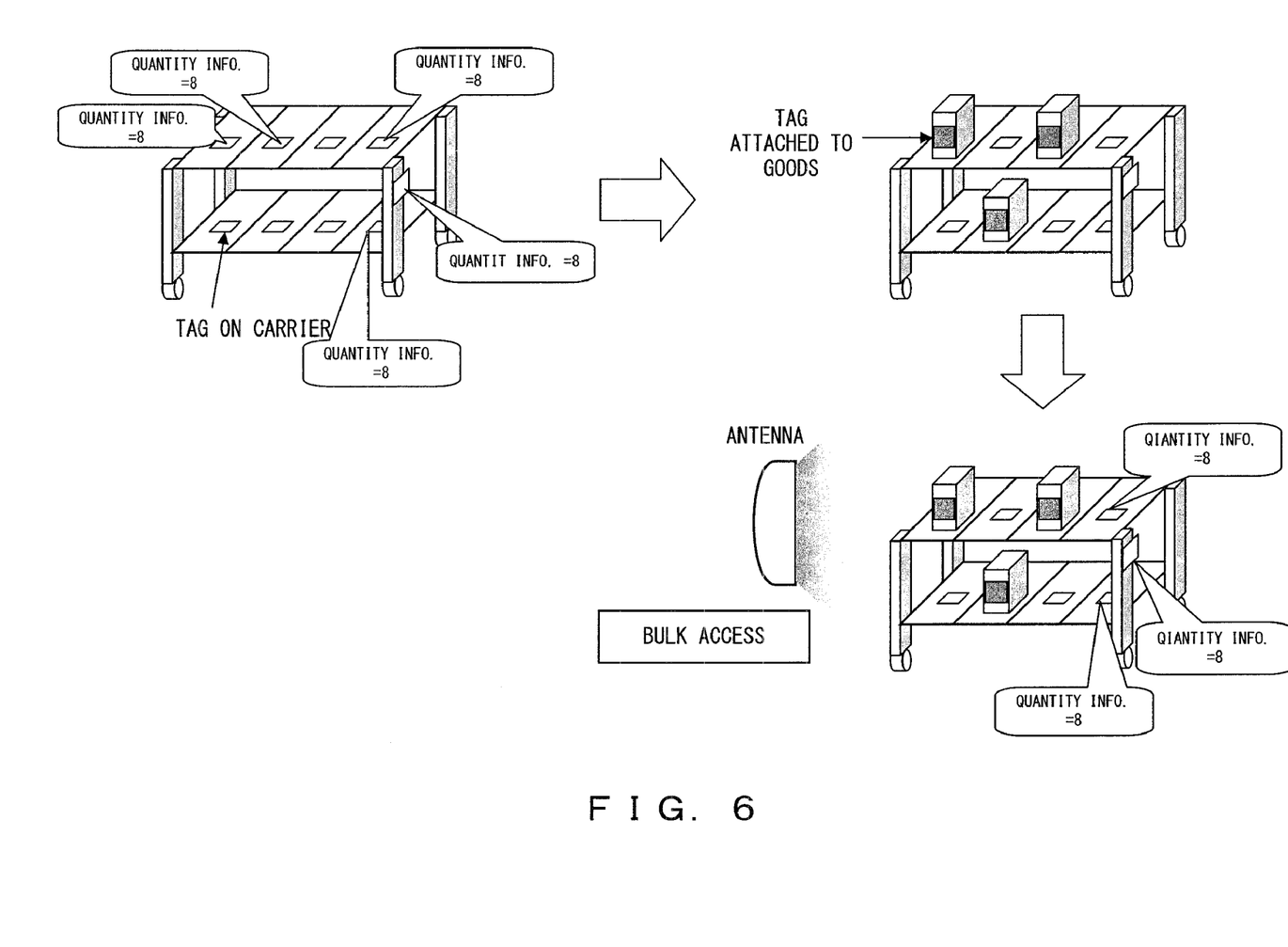
FIG. 6 is a diagram explaining the third embodiment of the present invention.

FIG. 6 is a diagram explaining the third embodiment of the present invention.

In the third embodiment, tags are placed on (plural) positions on the carrier where goods are to be mounted. In addition to the carrier ID (common ID in the same carrier), information of mountable quantity on the carrier is stored in each of the tags. By mounting the goods having a tag attached on the carrier, the tags on the carrier are blocked in sequence (blocked by the goods themselves or by providing to the carrier a mechanism to block the tags at the mounting). The order of the mounting on the carrier is not specified in particular. When the bulk access is performed for the tags attached to the goods on the carrier, the quantity information written in the tag on the carrier is read, and the quantity of the recognized tags on the carrier is counted. The quantity of the accessed tags attached to the goods is counted. The above three kinds of information are compared to each other. In accordance with the comparison result, the determination is made as below.

Quantity information=Accessed number of tags attached to goods+Accessed number of tags on carrier
    Normal termination
Quantity information>Accessed number of tags attached to goods+Accessed number of tags on carrier
    Inaccessible tags attached to goods present
Quantity information<Accessed number of tags attached to goods+Accessed number of tags on carrier
    Cannot happen (Tags not on the carrier have been accessed?)

In a case of FIG. 6, if the quantity information of tags on a carrier=8, and the accessed number of tags attached to the goods (=3)+the accessed number of tags on the carrier (=6)−1=8, the determination is made that the situation is normal. If the accessed number of tags attached to the goods+the accessed number of tags on the carrier−1 is 7 or less, it is determined that there are tags that could not be read. If the accessed number of tags attached to the goods+the accessed number of tags on the carrier−1 is 9 or above, the determination is made that the situation is abnormal.

Figure 7:
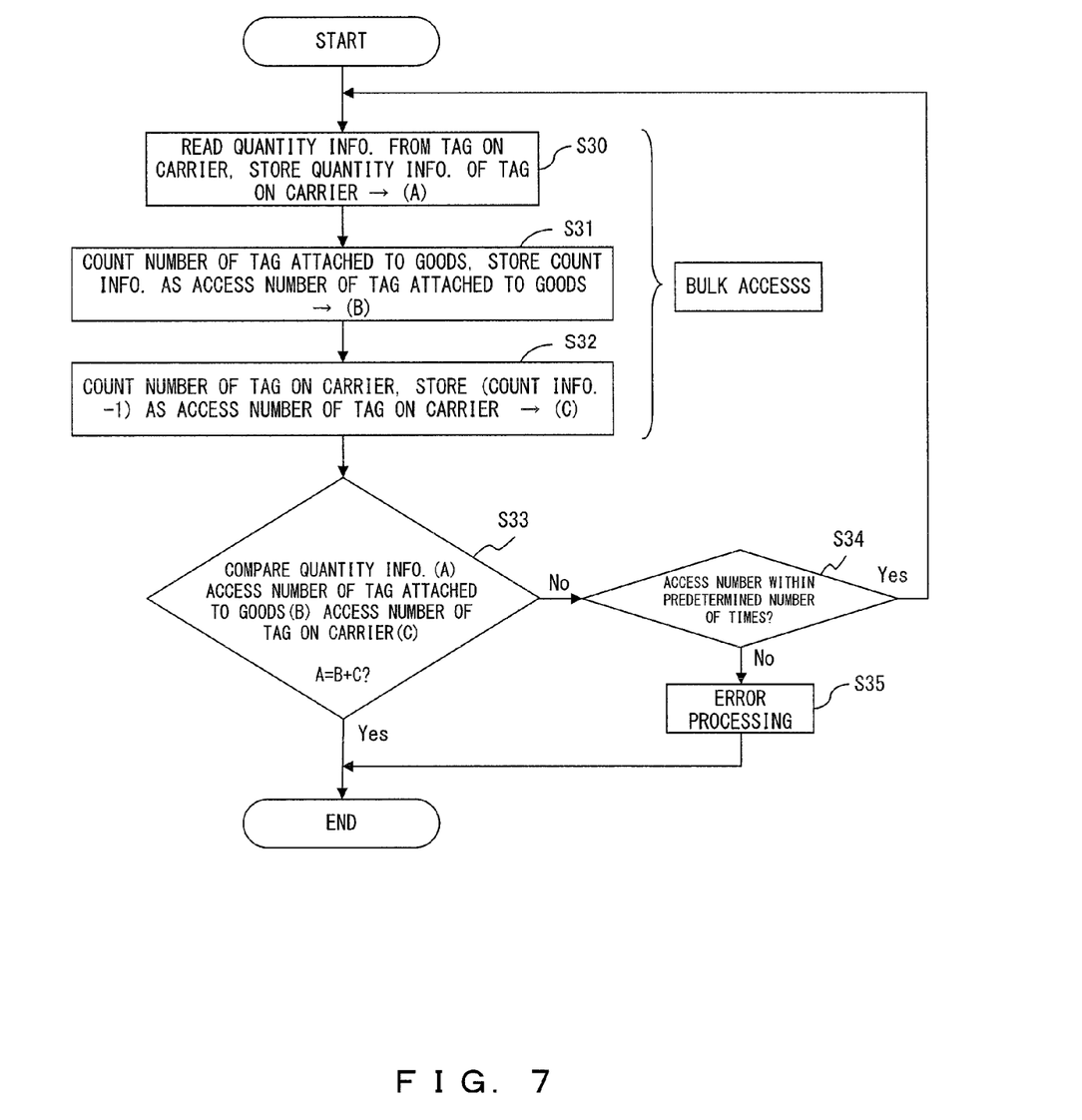
FIG. 7 is a flowchart of the bulk access processing that the reader/writer of the third embodiment performs.

FIG. 7 is a flowchart of the bulk access processing that the reader/writer of the third embodiment performs.

In step S30, the quantity information is read from a tag on the carrier, and the quantity information of the tags on the carrier is stored. In step S31, the number of tags attached to the goods is counted, and the count information is stored as the accessed number of tags attached to the goods. In step S32, the number of tags on the carrier is counted, and (the count information−1) is stored as the accessed number of tags on the carrier. Processing in step S30 and step S32 is performed in the bulk access. In step S33, it is determined whether the equation of quantity information=(accessed number of tags attached to goods)+(accessed number of tags on the carrier) is true or not. When the determination in step S33 is Yes, the processing is considered to be normal and is terminated. When the determination in step S33 is No, whether the number of times accessed is within the predetermined number of times or not is determined in step S34. When the determination in step S34 is Yes, the processing goes back to step S30, and the access to the tags is made again. When the determination in step S34 is No, the error processing is performed in step S35, and the processing is terminated.

What is claimed is:

1. A tag reader for detecting the number of goods via a tag attached to the goods and by counting the number of tags read by a reader/writer, comprising:
    a determination unit to determine whether reading of the tag is properly conducted or not by comparing a quantity of goods mounted on a goods mounting unit to which a tag including quantity information relating to the quantity of mounted goods is attached and quantity information of the tag attached to the goods mounting unit, wherein
    the goods mounting unit includes a plurality of tags attached thereto that stores a sequential number which coincides with the number of goods according to an order of mounting of the goods, and that is blocked when the goods are mounted in a mounting position for the goods, and
    the determination unit recognizes a minimum value of the information stored in the tag at the mounting position for the goods as a quantity of goods actually mounted, and determines whether the reading of the tag is properly conducted or not by comparing the quantity of tags attached to the goods with the quantity of goods actually mounted.

2. The tag reader according to claim 1, wherein the goods mounting unit has attached a tag storing an actual number of goods to be mounted as quantity information.

3. A tag reader for detecting the number of goods via a tag attached to the goods and by counting the number of tags read by a reader/writer, comprising:
    a determination unit to determine whether reading of the tag is properly conducted or not by comparing a quantity of goods mounted on a goods mounting unit to which a tag including quantity information relating to the quantity of mounted goods is attached and quantity information of the tag attached to the goods mounting unit, wherein
    the goods mounting unit includes a plurality of tags attached thereto that stores a number indicating a maximum number of goods that can be mounted and that is blocked when the goods are mounted in a mounting position for the goods, and a tag that stores information indicating the maximum number of goods that can be mounted and that is not blocked by the goods, and
    the determination unit determines whether the reading of the tag is properly conducted or not by comparing a sum of the number of tags attached to the goods and a quantity of tags that are blocked on the goods mounting unit subtracted by 1 with the maximum number of goods that can be mounted read from the tag attached to the goods mounting unit.

4. The tag reader according to claim 1, wherein in a case in which the reading of the tag is not properly conducted, the reading of the tag is repeatedly conducted within a range of a predetermined number of times.

5. The tag reader according to claim 1, further comprising:
    a notification unit to notify an operator that the reading of the tag is not being conducted properly, if the reading is not being conducted properly.

6. A mounting device for mounting and moving goods having a tag attached that a reader/writer can read, comprising:
    a tag storing information relating to a quantity of mounted goods; and
    a plurality of tags attached that stores a sequential number which coincides with the number of goods according to an order of mounting of the goods and that is blocked when the goods are mounted in a mounting position for the goods.

7. The mounting device according to claim 6, wherein a tag storing an actual number of goods to be mounted as quantity information is attached.

8. A mounting device for mounting and moving goods having a tag attached that a reader/writer can read, comprising:
    a tag storing information relating to a quantity of mounted goods;
    a plurality of tags attached that stores a number indicating a maximum number of goods that can be mounted and that is blocked when the goods are mounted in a mounting position for the goods; and
    a tag attached that stores information indicating the maximum number of goods that can be mounted and that is not blocked by the goods.

9. A management system for managing a flow of goods in a production line by a reader/writer reading a tag attached to the goods, comprising:
    a tag that is attached to the goods;
    a tag that stores information of a total number of goods and is provided for each carrier of the goods;
    a goods mounting unit that includes a plurality of tags that stores a sequential number which coincides with the number of goods according to an order of mounting of the goods, and that is blocked when the goods are mounted in a mounting position for the goods; and
    a determination unit that recognizes a minimum value of information stored in the tag at the mounting position for the goods as a quantity of goods actually mounted, and determines whether the reading of the tag is properly conducted or not by comparing the quantity of tags attached to the goods with the quantity of goods actually mounted.

10. The tag reader according to claim 3, wherein the goods mounting unit includes an attached tag storing an actual number of goods to be mounted as quantity information.

11. The mounting device according to claim 8, wherein a tag storing an actual number of goods to be mounted as quantity information is attached.

12. A management system for managing a flow of goods in a production line by a reader/writer reading a tag attached to the goods, comprising:
    a tag attached to the goods;
    a tag that stores information of a total number of goods and is provided for each carrier of the goods;
    a goods mounting unit attached with a plurality of tags that stores a number indicating a maximum number of goods that can be mounted and that is blocked when the goods are mounted in a mounting position for the goods, and a tag that stores information indicating the maximum number of goods that can be mounted and that is not blocked by the goods; and a determination unit that determines whether the reading of the tag is properly conducted or not by comparing a sum of the number of tags attached to the goods and a quantity of tags that are blocked on the goods mounting unit subtracted by 1 with the maximum number of goods that can be mounted read from the tag attached to the goods mounting unit.

* * * * *